Jan. 8, 1963  R. GASPARETTI ETAL  3,072,267
BROADSIDE TRANSFER DEVICE FOR ELONGATED METAL ARTICLES
Filed Sept. 16, 1960  3 Sheets-Sheet 1
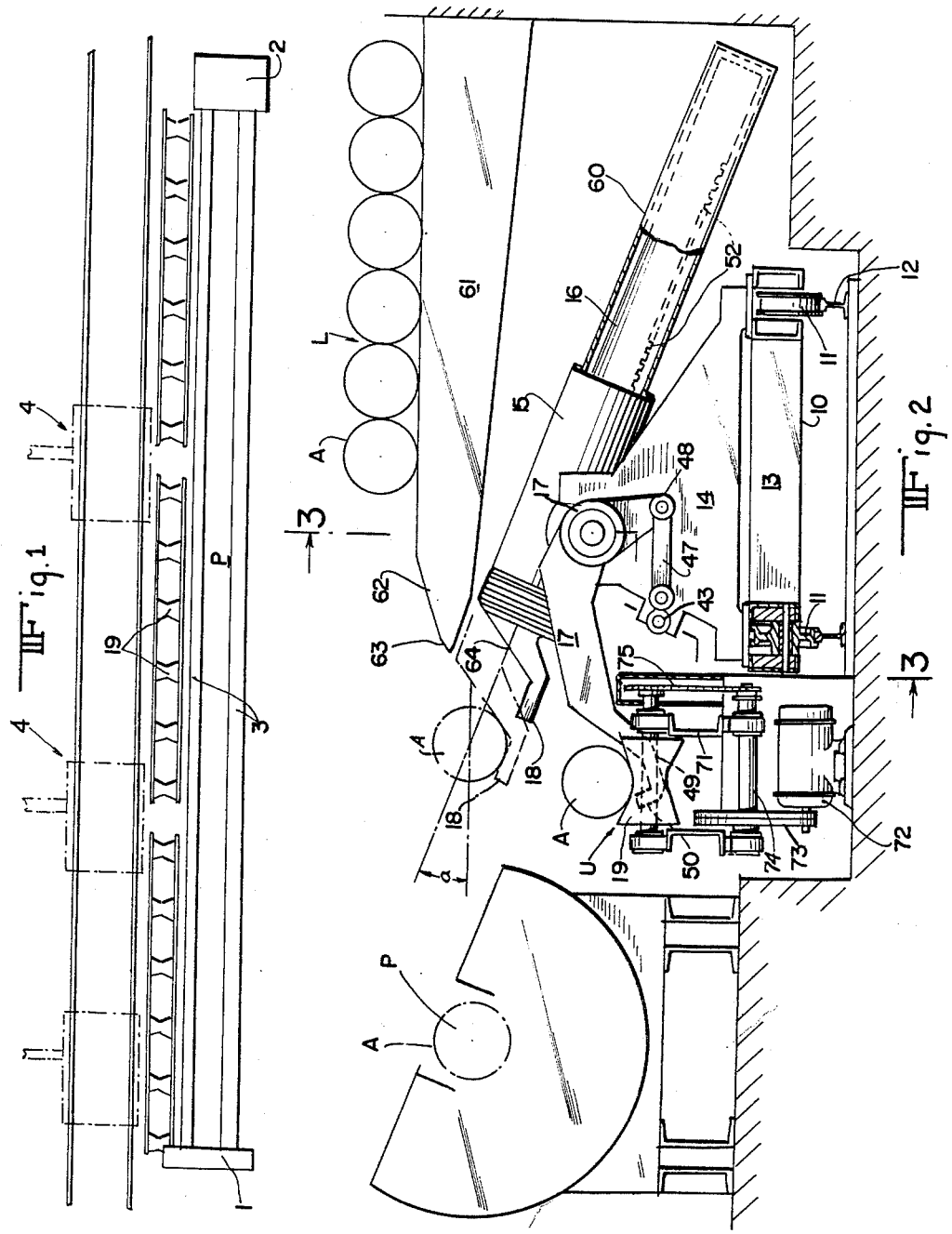
INVENTORS
RENATO GASPARETTI
ZYGMUNT WISLOUCH
BY
ATTORNEYS

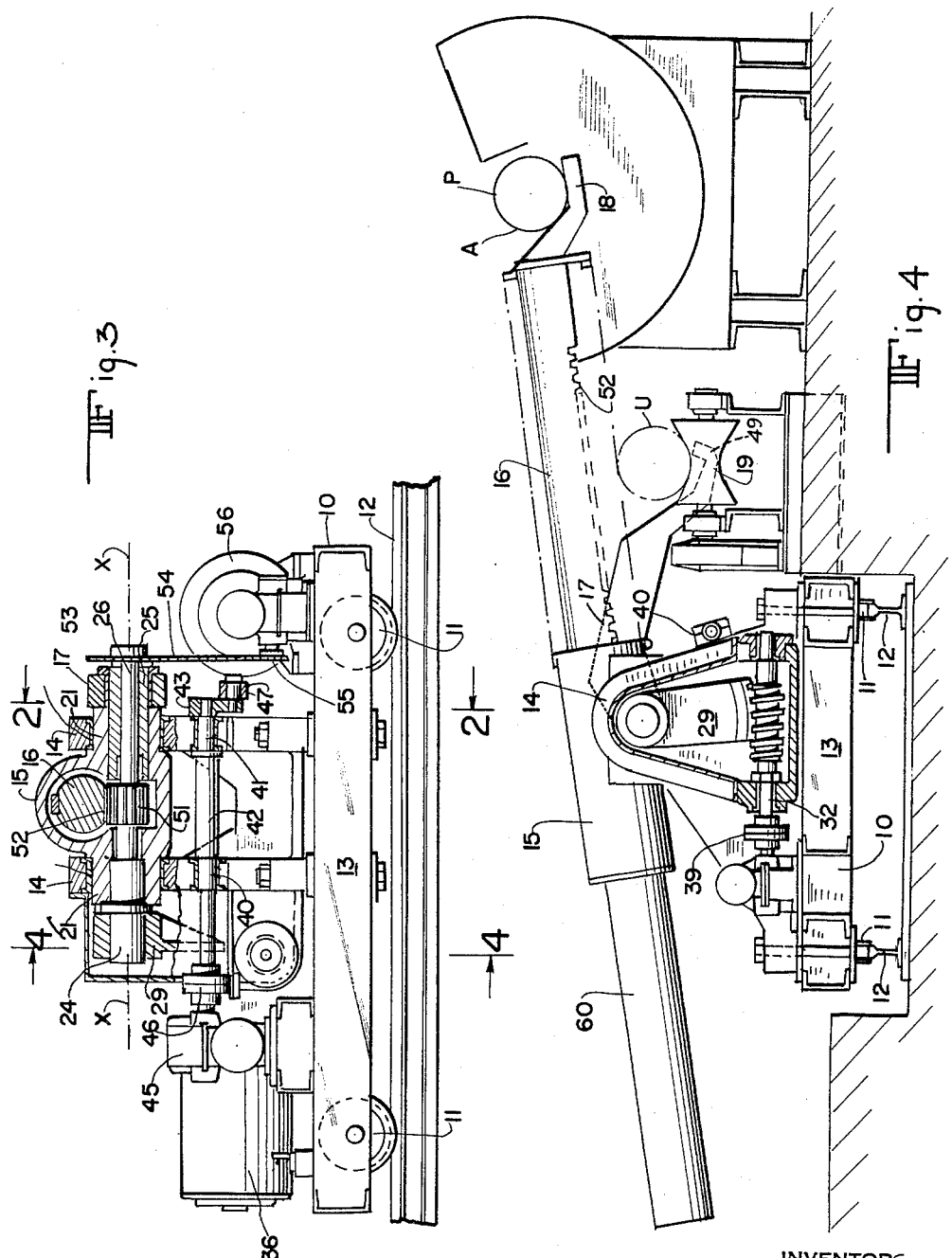

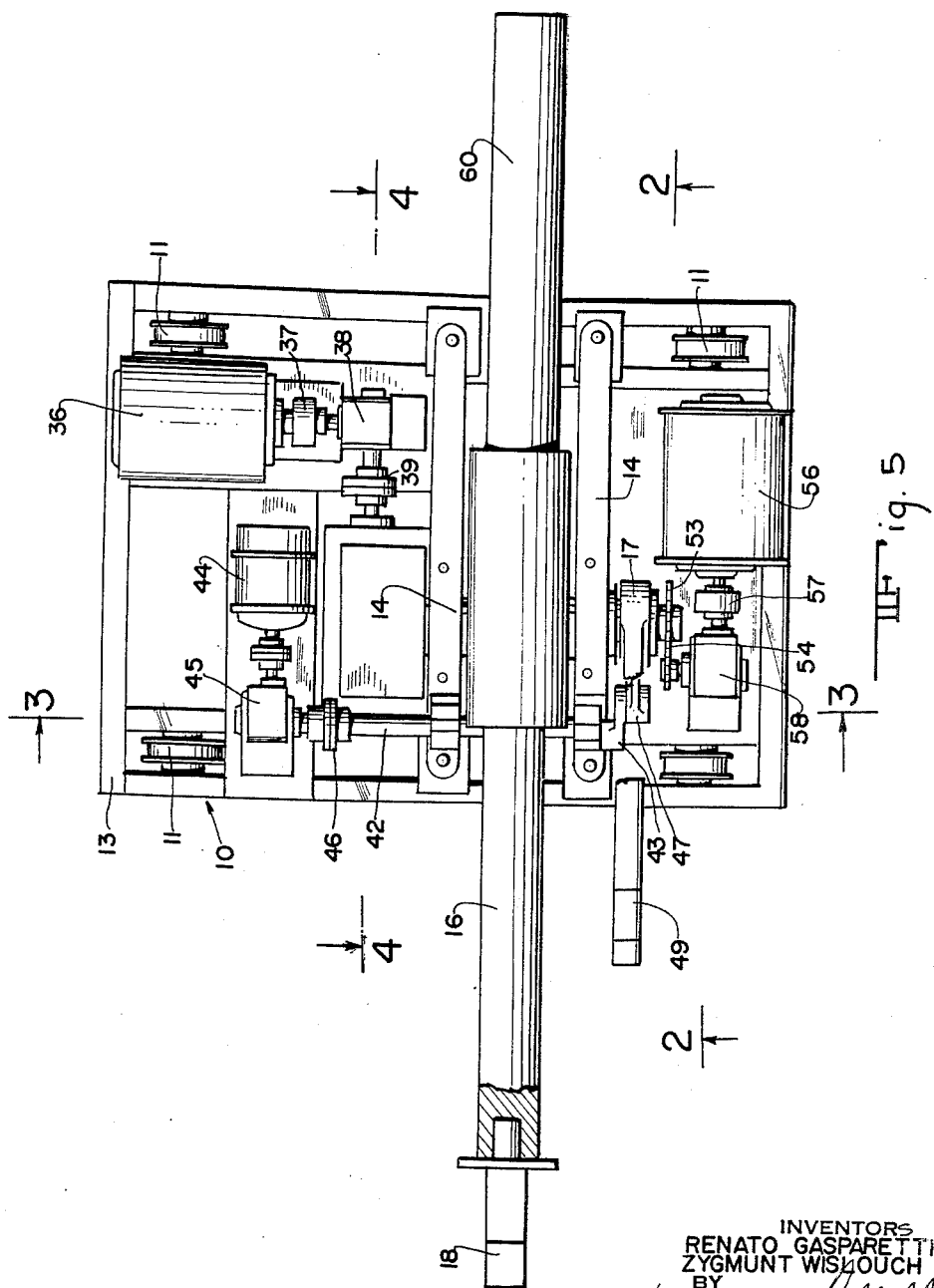

United States Patent Office 3,072,267
Patented Jan. 8, 1963

3,072,267
BROADSIDE TRANSFER DEVICE FOR ELONGATED METAL ARTICLES
Renato Gasparetti, Bournemouth, and Zygmunt Wislouch, Dorset, England, assignors to The Loewy Engineering Company Limited, Bournemouth, England, a corporation of Great Britain
Filed Sept. 16, 1960, Ser. No. 56,595
Claims priority, application Great Britain Sept. 18, 1959
4 Claims. (Cl. 214—1)

Finished or semi-finished elongated metal articles, such as rolled, drawn or extruded metal rods or bars are usually transported from one handling station to another inside a processing plant by mechanical means of special design. When transporting these articles in plant of this kind, several problems arise which so far have not been solved satisfactorily.

The articles in question are often many feet long and at the same time of slender cross-section; they are therefore awkward to handle, especially when the space available is restricted. Sometimes the articles, when in the semi-finished condition, are bent, twisted or otherwise deformed, and this adds greatly to the difficulties. Further difficulties arise from the fact that the articles are often at elevated temperatures due to the heat which they retain from a prior forming operation.

In practice, the movement of the finished or semi-finished articles from one point to another within a plant has usually to be integrated into a given cycle of operations. It becomes then important to ensure that the transport of the articles from one point to another of the plant is carried out expeditiously so that the times required for transport are reduced to a minimum.

It is also desirable that the transport means which carry any finished or semi-finished elongated articles through a plant are so designed and arranged that they require as little extra floor as possible.

It has further to be taken into account that some of the processing machines for these articles are so laid out as to permit only broadside entry or discharge of the articles.

It is an object of the present invention to provide a transport device, specially adapted for carrying finished or semi-finished elongated metal articles which is capable of moving these articles in a smooth manner from one handling station to another inside a processing plant.

It is another object of the present invention to provide a transport device for finished or semi-finished elongated metal articles which is capable of delivering these articles to a processing machine by broadside transfer and taking them out of the machine again in the same way.

It is another object of the present invention to provide a transport device for finished or semi-finished elongated metal articles which is capable of handling articles which are deformed by being bent, twisted or otherwise.

It is still further object of the present invention to provide a device for the transport of finished or semi-finished elongated metal articles in which the transport times are short and the idle times curtailed to a minimum.

It is a final object of the present invention to provide a transport device for finished or semi-finished elongated metal articles which requires a minimum of extra floor space.

An embodiment of the device according to the invention is shown in the accompanying drawings by way of example in which:

FIGURE 1 is a layout of a plant in which a transfer device according to the invention is employed for feeding articles from a loading station into processing machine and for taking the articles out of the machine and depositing them on to an unloading station.

FIGURES 2, 3, 4 and 5 are detail views of the device on a larger scale; of these, FIGURE 2 is an elevation partly in section along the line 2—2 of FIGS. 3 and 5; FIGURE 3 is an elevation partly in section along line 3—3 of FIGS. 2 and 5 without the loading platform; FIGURE 4 is an elevation partly in section along line 4—4 of FIGS. 3 and 5; FIGURE 5 is a plan view partly in section again without the loading platform.

The invention is shown on the drawings as being incorporated into a plant comprising a machine for rectifying the shape of semi-finished elongated metal articles. The machine here is a combined stretching and detwisting machine and the articles are extruded bars. Combined stretching and detwisting machines are known in themselves, and as the machine does not form part of the present invention, a brief description is sufficient.

The machine is shown only diagrammatically in FIGURE 1 and comprises two grippers 1 and 2 which are held together by plates 3, extending length-wise of the machine. One of the grippers is provided with hydraulic power means not shown, the other one can be traversed along the machine bed and anchored at a distance from the other gripper determined by the length of the article to be stretched or detwisted.

The articles to be rectified are fed in batches into the processing zone P of the machine which extend longitudinally between the two grippers 1 and 2 to which the articles are clamped before stretching or detwisting is started. Preferably the grippers and their associated parts have a through longitudinal passageway so that the articles can be moved lengthwise relative to the grippers 1 and 2. This passageway permits therefore the detwisting device and an article to be moved relative to each other so that the detwisting device can be applied to any longitudinal part of the article.

The position of the processing zone between the grippers 1 and 2 is such that the best method of entering articles into this zone and of taking them out again is by broadside transfer. This movement is accomplished by the device according to the present invention which comprises a number of separate transfer units 4 arranged side by side so that an elongated article A can be supported by these units simultaneously at several points. The units 4 are of identical design and it will be sufficient to describe only one of them.

Each unit consists of a trolley 10, which with its wheels 11 can be traversed on a track 12 running alongside the stretching machine and as far as a loading station L. Mounted on a frame 13 of this trolley are two pedestals 14 which pivotally support those parts of the unit which effect the broadside transfer of the articles.

These parts comprise essentially a tubular guide 15 supported on the pedestals 14 so as to be capable of being tilted up or down in a vertical plane parallel to the direction of broadside transfer, further a beam 16 which can slide in or out of the guide 15 in the same vertical plane, and an arm 17 pivoted about the same axis as the guide 15, so that it can also be tilted up and down in its vertical plane, but independently of the guide 15 and the beam 16. The beam 16 is provided at one end with a support cradle 18 for the articles to be transferred the cradle being open at its front end, and the arm 17 is provided at one end with a trough-shaped support cradle 49 for the same purpose. It will be observed that, whilst the articles can freely roll or slide off from the cradles 18, they are prevented from doing so with respect to the trough-shaped cradles 49 by their ridges 50.

Supported on each of the pedestals 14 are bearings 20 for horizontal trunnions 21, projecting from diametrically opposite points of the tubular guide 15 so that the guide together with the beam 16 can be tilted up and down about the horizontal axis X—X of the trunnions 21 (FIGURE 3). This tilting movement is imparted to the guide 15 by a reversible motor 36 through a reduction gear 38, a shaft coupling 39, a worm-shaft 32 and a worm-wheel segment 29, secured to a stub shaft 24 which is secured to one of the trunnions 21. The maximum angle of tilt of the beam 16 is indicated at "a" in FIGURE 2. The up and down movement of the beam 16 is controlled by an electromagnetic brake 37 (which is also used for retaining the beam 16 in its upper position) and suitable limit switches, not shown here, which are arranged in the circuits of the motor 36 and the brake 37.

The arm 17 can be tilted about the same axis X—X as the beam 16, though independently of it. This movement is imparted to the arm 17 by a reversible motor 44, reduction gear 45, shaft coupling 46 and shaft 42, the latter being supported in extensions 40, 41 of the pedestals 14. Arranged at the end of the shaft 42 is a crank 43 which through the intermediary of a link 47 is connected to an extension 48 of arm 17 (FIG. 2, 3 and 5). The movement of the arm 17 is controlled by limit switches—not shown—in the circuit of motor 44.

The longitudinal displacement of the beam 16 relative to the guide 15 is effected by a reversivle motor 56, reduction gear 58, a first sprocket gear 55, chain 54, a second sprocket 53 and shaft 26. The latter carries a pinion 51 which is in mesh with a rack 52, provided on the beam 16 and extending for a substantial part of the latter's length (FIGS. 3, 4 and 5). The longitudinal movement of the beam 16 is controlled by an electromagnetic brake 57 (which is also used for keeping the beam in its upper position) and limit switches not shown, and arranged in the circuits of the motor 56 and the brake 57. Attached to one end of the guide 15 is a casing 60 which protects part of the beam 16. The shaft 26 passes through a hollow stub shaft 25 which forms a bearing for the arm 17 and is secured to one of the trunnions 21 of guide 15.

The loading station L is shown in FIG. 2 as including a platform or table 61 on which the articles A are laid out side by side prior to their being entered into the stretching machine. The platform 61 may be situated next to the runout table (not shown) of an extrusion press or to any other conveyor means for the article A. The table 61 has near its edge facing the stretching machine a sloping part 62 from which the articles can slide or roll off to be subsequently received by the transport device. The slope 62 is bent down at 63 so as to guide the articles from the platform 61 to the transport device.

The unloading station U includes a conveyor with rollers 19 on to which the articles A are deposited by the arms 17 which to this end can be lowered into the gaps between the rollers 19. This conveyor takes the articles A from the stretching machine to a storage place, not shown, or to another processing station. The rollers 19 are supported in a frame 71 and each driven by a motor 72 through a belt drive 73 (FIG. 2), an intermediate shaft 74 and a sprocket gear 75.

In the following a cycle of operations of the transfer device will be described, it being assumed that the units 4 move in unison with all their parts having the same positions at the same time.

When at rest the beams 16 are fully retracted below the platform 61 and tilted upwards whilst the arms 17 are lowered so that their cradles 49 disappear below the upper level of the rollers 19 (FIG. 2). In order to make the beams ready for a transfer operation and to receive an article A from the loading station L, they are advanced by the rack and pinion gear 51 and 52 a short distance into the chain-line position shown in FIG. 2 in which the backs 64 of the cradles 18 form a continuation of the end 63 of the slope 62. An article A is then allowed to roll or to slide off the slope 62 into the cradles 18 where it comes to rest, leaning against their backs 64.

The beams 16 are next fully advanced and lowered by tilting the guides 15 about the axis X—X until the article A is within the processing zone P, ready to be engaged by the two grippers 1 and 2 of the stretching machine (FIGURE 4). The advance and tilting movements of the beams 16 can either be carried out one after another, as shown diagrammatically in FIGURE 2, or simultaneously. After the article A has been clamped to the grippers 1 and 2, the cradles 18 are moved away. In many cases it will be sufficient to withdraw them only by a short distance at this stage so that they can be moved back into an article-supporting position almost immediately after the straightening operation has been terminated. However, in the event of a gripper having to be moved alongside an article A, which is the case when a detwisting device has to be placed between the ends of an article, the cradles 18 have to be retracted from the processing zone by a longer distance in order to clear the path for the movement of this gripper.

After an article A has been straightened the cradles 18 are advanced into the processing zone P where they receive the article A upon its release from the grippers 1 and 2. The cradles 18 are thereupon retracted far enough to enter into the orbit of the cradles 49 which then can take over, the arms 17 having previously been lifted by the cranks 43 and links 47. After the cradles 49 have taken over, the arms 17 are lowered below the top level of the rollers 19, depositing thereby the article A onto these rollers.

It will be seen from FIGURE 2 that the position of the cradles 18 in which they enter the orbit of the cradles 49 happens to coincide substantially with that in which the cradles 18 are ready for the reception of an article A from the platform 61. The take-over of an article by the cradles 49 from the cradles 18 can therefore be immediately followed by transferring another article from the platform 61 to the cradles 18 and it is therefore not necessary to delay the transfer of an unprocessed article from the platform 61 to the processing zone until a processed article has been received at the unloading station.

The provision of two separate and independently movable elements, the beams 16—which have to be of considerable length—and the comparatively short arms 17, arises from the manner in which the rollers 19 are arranged here relative to the platform 61 and to the stretching machine. As will be seen from FIG. 2, the platform 61 is separated from the stretching machine by a distance just wide enough for the accommodation of the conveyor rollers 19 and their frames, and the axis of tilt X—X is close to these rollers. With this arrangement the platform 61 will obstruct the rear ends of the beams 16 when they make the full tilting movement required for lowering the cradles 18 from the level of the processing zone P to that of the unloading zone U. This obstruction is here avoided by the provision of separate transfer elements in the form of the relatively short arms 17 which are capable of being tilted by a greater angle than the beams 16.

The combination of the beams 16 and the arms 17 has a number of further advantages. As stated before, it is possible to transfer an article A from the cradles 18 to the cradles 49 in such a manner that the cradles take an unprocessed article from the loading station whilst the arms 17 complete the transfer of a processed article to the unloading zone U, whereby time is saved.

It is a further advantage to leave the cradles 18 without any ridge at the outer ends as this enables these cradles to be withdrawn from the processing zone, without requiring the beams 16 to be lowered first. On the other hand, the upwardly projecting ridge at the outer ends of the cradles 49 prevents the articles from rolling or sliding off, whilst the arms 17 are lowered. The ridge of the cradles 49 can be further used to advantage in those cases where there is the risk of articles being thrown off the cradles 18 through the impact which they receive when coming to rest on them. This risk can be eliminated by raising temporarily the cradles 49 to the level of the beams 16 so that an article A, on leaving the platform 61, is first received by the cradles 49 which prevent the article from falling off.

It has been assumed in the foregoing that the beams 16 of all units 4 project by equal amounts from the guides 15 so that their ends are all on one straight line which is parallel to the longitudinal axis of the stretching machine and its processing zone. This is satisfactory only as long as the articles to be transferred by these units are straight from end to end. This condition is hardly ever fulfilled in the case of articles which have to undergo a rectifying operation. Such articles are bent or twisted at one or more places, sometimes to an extent which makes their transport by ordinary means difficult, if not impossible.

It is a special feature of the device according to the present invention that it can be used for transporting elongated semi-finished or finished metal articles which are severely distorted through being bent or twisted at one or more places. This is achieved by the adjustability of the beams 16 and the cradles 18 which can be moved independently of each other and relative to each other. It is thereby possible to move the cradles 18 into positions which correspond to the shape of a distorted article so that each cradle will take its share of the load. This is particularly important in the case of heavy and long articles which have to be supported at as many points as possible in order to prevent them from deflection under their own weight.

It will be seen that the means by which the positions of the beams 16 and of the cradles 18 can be adjusted are the same which accomplish the transfer of an article from the platform 62 to the processing zone P.

Once the beams 16 have been adjusted, their further movements and those of the arms 17 can be automatically controlled, if desired, by such means as the aforementioned limit switches in the circuits of the motors 36, 44 and 56 and of the brakes 37 and 57.

The transfer device according to the invention enables elongated semi-finished and finished metal articles, including articles of considerable length, to be smoothly moved from one station to another and with a minimum of delay. As shown, the device permits a quick transport of elongated articles in the case of an arrangement in which the unloading station U is at the same side of the processing station P as the loading station L, though at a lower level. This is an arrangement which in many installations is preferred because it leaves one side of the processing machine entirely free and therefore easily accessible.

Further, by arranging a considerable part of the device according to the invention below the loading station L, no extra floor space is required, as can be best seen from FIGURE 2.

It has been assumed here that the loading station L and the processing station P are directly opposite each other. This need not be the case, and it may occur that the loading station is some distance away from the processing station. In this event, the units 4 are moved along their track 12 from the loading station to the processing station, after they have received an article to be transferred; otherwise the cycle of operations remains the same.

Details of the device such as the drives for the beams 16 and the arms 17 may be changed without altering the scope of the invention.

In the example shown in the figures, the article A has been represented, for the sake of simplicity, as a plain cylindrical body. It is evident that the device can be used for the transfer of articles of any desired shape and in particular of intricate sections.

What we claim is:

1. In a processing plant for elongated articles, a loading station arranged alongside a processing station and an unloading station positioned intermediate said loading and processing stations but at a lower level therefrom, the center lines of said stations being parallel, a broadside transfer device comrpising a plurality of units arranged below the loading station and alongside the unloading station and providing together a plurality of longitudinal spaced apart supports for an article during transfer between said stations each unit comprising a frame, a guide structure mounted on said frame for pivotal movement about an axis parallel to the center lines of said stations, a primary article-transfer member mounted in said guide structure for longitudinal movement in a plane normal to said axis, a cradle on said primary member arranged to serve as a support for an article, a secondary article-transfer member mounted on said frame for pivotal movement about an axis parallel to the center lines of said stations, a further cradle on said secondary member arranged to serve as a support for an article, drive means operative to effect pivotal movement of said guide structure and longitudinal movement of said primary member whereby the cradle on said primary member is movable to effect transfer of an article thereon from the loading station to the processing station and subsequently to an intermediate station, and drive means operative to effect pivotal movement of said secondary member whereby the cradle on said secondary member is movable to effect transfer of an article thereon from the intermediate station to the unloading station.

2. In a processing plant for elongated articles, a loading station arranged alongside a processing station and an unloading station positioned intermediate said loading and processing stations but at a lower level therefrom, the center lines of said stations being parallel, a broadside transfer device comprising a plurality of units arranged below the loading station and alongside the unloading station and providing together a plurality of longitudinally spaced apart supports for an article during transfer between the stations, each unit comprising a frame, a tubular guide structure mounted on said frame for pivotal movement about an axis parallel to the center lines of said stations, a primary article-transfer member mounted in said guide structure for longitudinal movement in a plane normal to said axis, a cradle on said primary member arranged to serve as a support for an article, a secondary article-transfer member spaced from said primary article-transfer member and mounted on said frame for pivotal movement about the pivot axis of the primary member, a further cradle on said secondary member arranged to serve as a support for an article, drive means operative to effect pivotal movement of said tubular guide structure and longitudinal movement of the said primary member whereby the cradle on said primary member is movable to effect transfer of an article thereon from the loading station to the processing station and subsequently to an intermediate station, and drive means operative to effect pivotal movement of said secondary member whereby the cradle on said secondary member is movable to effect transfer of an article thereon from the intermediate station to the unloading station.

3. In a processing plant for elongated articles, a loading station arranged alongside a processing station and an unloading station positioned intermediate said loading and processing stations but at a lower level therefrom, the center lines of said stations being parallel, a broadside transfer device comprising a plurality of units arranged below the loading station and alongside the unloading station and providing together a plurality of longitudinally spaced apart supports for an article during transfer between the stations, each unit comprising a carriage movable in directions parallel to the center lines of said stations, a frame mounted on said carriage, a guide structure mounted on said frame for pivotal movement about an axis parallel to the center lines of said stations, a primary article-transfer member mounted on said guide structure for longitudinal movement in a plane normal to said axis, a cradle on said primary member arranged to serve as a support for an article, said cradle being open at the side remote from the loading station, a secondary article-transfer member spaced from said primary member and mounted on the frame for pivotal movement about said axis, a trough-like cradle on said secondary member arranged to serve as a support for an article, drive means operative to effect pivotal movement of said guide structure and longitudinal movement of said primary member whereby the cradle on said primary member is movable to effect transfer of an article thereon from the loading station to the processing station and subsequently to an intermediate station, and drive means operative to effect pivotal movement of said secondary member whereby the cradle on said secondary member is movable to effect transfer of an article thereon from the intermediate station to the unloading station, the drive means of each unit being operable independently of the drive means of the other units.

4. A broadside transfer device for a processing plant for elongated articles, said processing plant having a loading station arrange alongside a processing station and an unloading station positioned intermediate said loading station and processing station but at a lower level therefrom, the center lines of said stations being parallel said broadside transfer device comprising a plurality of units adapted to be arranged below a loading station and alongside an unloading station and providing together a plurality of longitudinally spaced apart supports for an article during transfer between said stations, each unit comprising a frame, a guide structure mounted on said frame for pivotal movement about an axis parallel to the center lines of said stations, a primary article-transfer member mounted in said guide structure for longitudinal movement in a plane normal to said axis, a cradle on said primary member arranged to serve as a support for an article, a secondary article-transfer member mounted on said frame for pivotal movement about an axis parallel to the center lines of said stations, a further cradle on said secondary member arranged to serve as a support for an article, drive means operative to effect pivotal movement of said guide structure and longitudinal movement of said primary member whereby the cradle on said primary member is movable to effect transfer of an article thereon from the loading station to the processing station and subsequently to an intermediate station, and drive means operative to effect pivotal movement of said secondary member whereby the cradle on said secondary member is movable to effect transfer of an article thereon from the intermediate station to the unloading station.

References Cited in the file of this patent

UNITED STATES PATENTS

| 1,933,225 | Smith | Oct. 31, 1933 |
| 2,426,095 | Hecker | Aug. 19, 1947 |
| 2,584,466 | Kaserman | Feb. 5, 1952 |
| 2,943,750 | Sehn | July 5, 1960 |
| 2,959,268 | McConnell | Nov. 8, 1960 |